United States Patent
Stephens et al.

(10) Patent No.: US 7,911,076 B2
(45) Date of Patent: Mar. 22, 2011

(54) WIND DRIVEN POWER GENERATOR WITH MOVEABLE CAM

(75) Inventors: Thomas G. Stephens, Grand Prairie, TX (US); Stephen C. Else, Dallas, TX (US)

(73) Assignee: Broadstar Developments, LP, Dallas, TX (US)

( * ) Notice: Subject to any disclaimer, the term of this patent is extended or adjusted under 35 U.S.C. 154(b) by 503 days.

(21) Appl. No.: 12/110,100

(22) Filed: Apr. 25, 2008

(65) Prior Publication Data

US 2008/0258469 A1    Oct. 23, 2008

Related U.S. Application Data

(63) Continuation-in-part of application No. 11/505,966, filed on Aug. 17, 2006, now Pat. No. 7,365,448.

(60) Provisional application No. 61/031,317, filed on Feb. 25, 2008.

(51) Int. Cl.
*F03D 9/00* (2006.01)

(52) U.S. Cl. .............................. 290/55; 290/44; 416/122

(58) Field of Classification Search .................. 290/43, 290/44, 54, 55; 415/60; 416/122
See application file for complete search history.

(56) References Cited

U.S. PATENT DOCUMENTS

| | | | |
|---|---|---|---|
| 1,321,415 A * | 11/1919 | Winmill | .................. 416/118 |
| 2,360,792 A | 10/1944 | Putnam | |
| 3,995,170 A | 11/1976 | Graybill | |
| 4,115,027 A | 9/1978 | Thomas | |
| 4,178,126 A | 12/1979 | Weed | |
| 4,494,007 A | 1/1985 | Gaston | |
| 4,659,940 A | 4/1987 | Shepard | |

(Continued)

FOREIGN PATENT DOCUMENTS

GB    1911/23102 A    5/1912

(Continued)

OTHER PUBLICATIONS

Moran, W.A., Giromill Wind Tunnel Test and Analysis, vol. I—Executive Summary; Final Report for the Period Jun. 1976-Oct. 1977; published Oct. 1977 (20 pages).

(Continued)

*Primary Examiner* — Nicholas Ponarenko
(74) *Attorney, Agent, or Firm* — The Emanuelson Firm; Kenneth T. Emanuelson

(57) ABSTRACT

A wind driven generator includes a rotor disposed in a cylindrical duct and supported by a frame for rotation in response to wind flowing through the duct. The rotor includes plural circumferentially spaced paralleled rotor blades supported for rotation about a generally horizontal axis. Each blade is supported for pivotal movement to change blade pitch, angle of attack or camber as the rotor rotates. A pitch or camber control motor, self-governing wind vane mechanism, or governing mechanism is operable to move a circular cam to vary blade pitch or camber to control rotor speed. The duct is mounted on a mast having a base supported on a foundation for pivotal movement to face the wind for maximizing air flow through the duct. Electric power generators are connected to opposite ends of the rotor at respective power output or drive shafts.

13 Claims, 19 Drawing Sheets

U.S. PATENT DOCUMENTS

| | | | |
|---|---|---|---|
| 4,792,700 A | 12/1988 | Ammons | |
| 4,960,363 A * | 10/1990 | Bergstein | 415/3.1 |
| 5,332,925 A * | 7/1994 | Thomas | 290/44 |
| 5,495,128 A | 2/1996 | Brammeier | |
| 5,969,430 A | 10/1999 | Forrey | |
| 6,069,409 A | 5/2000 | Fowler et al. | |
| 6,158,953 A | 12/2000 | Lamont | |
| 6,320,273 B1 * | 11/2001 | Nemec | 290/55 |
| 6,688,842 B2 * | 2/2004 | Boatner | 415/4.2 |
| 6,784,566 B2 * | 8/2004 | Thomas | 290/55 |
| 6,929,450 B2 | 8/2005 | Noble | |
| 6,952,058 B2 | 10/2005 | McCoin | |
| 7,075,192 B2 | 7/2006 | Bywaters et al. | |
| 7,098,552 B2 * | 8/2006 | McCoin | 290/44 |
| 7,132,760 B2 | 11/2006 | Becker | |
| 7,365,448 B2 * | 4/2008 | Stephens | 290/55 |
| 2004/0061337 A1 | 4/2004 | Becker | |
| 2004/0100103 A1 | 5/2004 | Becherucci et al. | |

FOREIGN PATENT DOCUMENTS

| | | |
|---|---|---|
| KR | 10-0490683 | 4/2004 |
| KR | 10-0558462 | 4/2005 |
| KR | 10-0558463 | 4/2005 |
| WO | WO 2005/068833 A2 | 7/2005 |

OTHER PUBLICATIONS

Kim, Seung Jo, et al., "Design and Performance of Tests of Cycloidal Propulsion Systems," American Institute of Aeronautics and Astronautics, Apr. 7, 2003, 11 pp.

Kim, Seung Jo, "Efficiency Improvement of Cycloidal Wind Turbine by Active Control of Blade Motion," 16th Conference on Adaptive Structures, Paris, France, Oct. 9, 2005, 9 pp.

Hwang, Seong, "Efficiency Improvement of a New Vertical Axis Wind Turbine by Individual Active Control of Blade Motion," SPIE 13th Annual Symposium, San Diego, CA, Feb. 26, 2006, 8 pp.

* cited by examiner

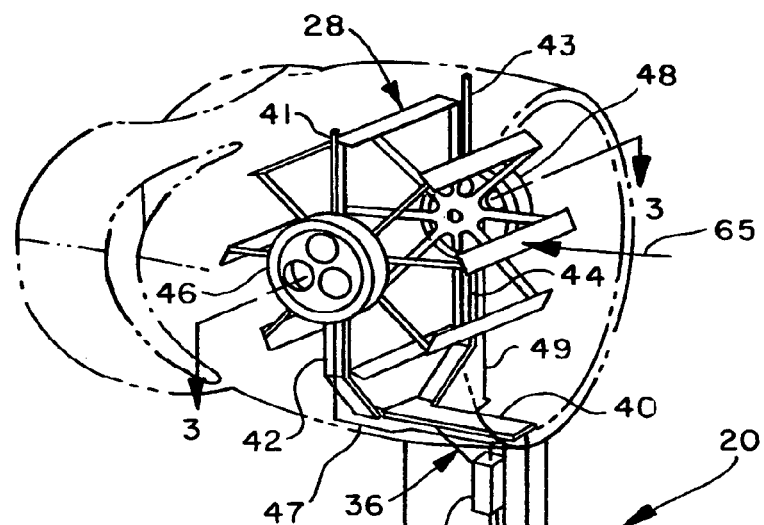
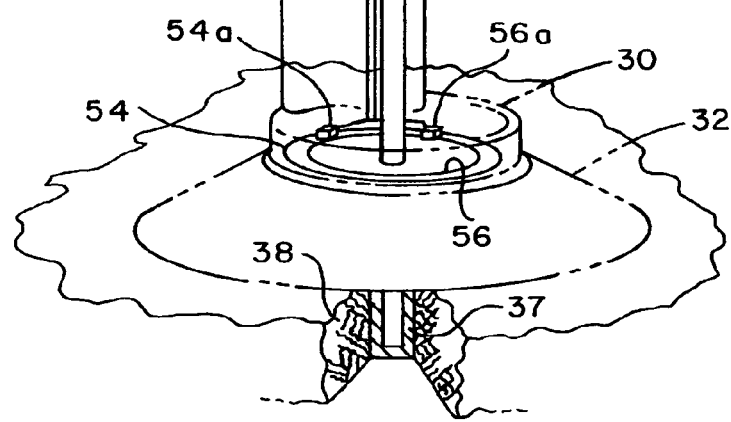
FIG. 2

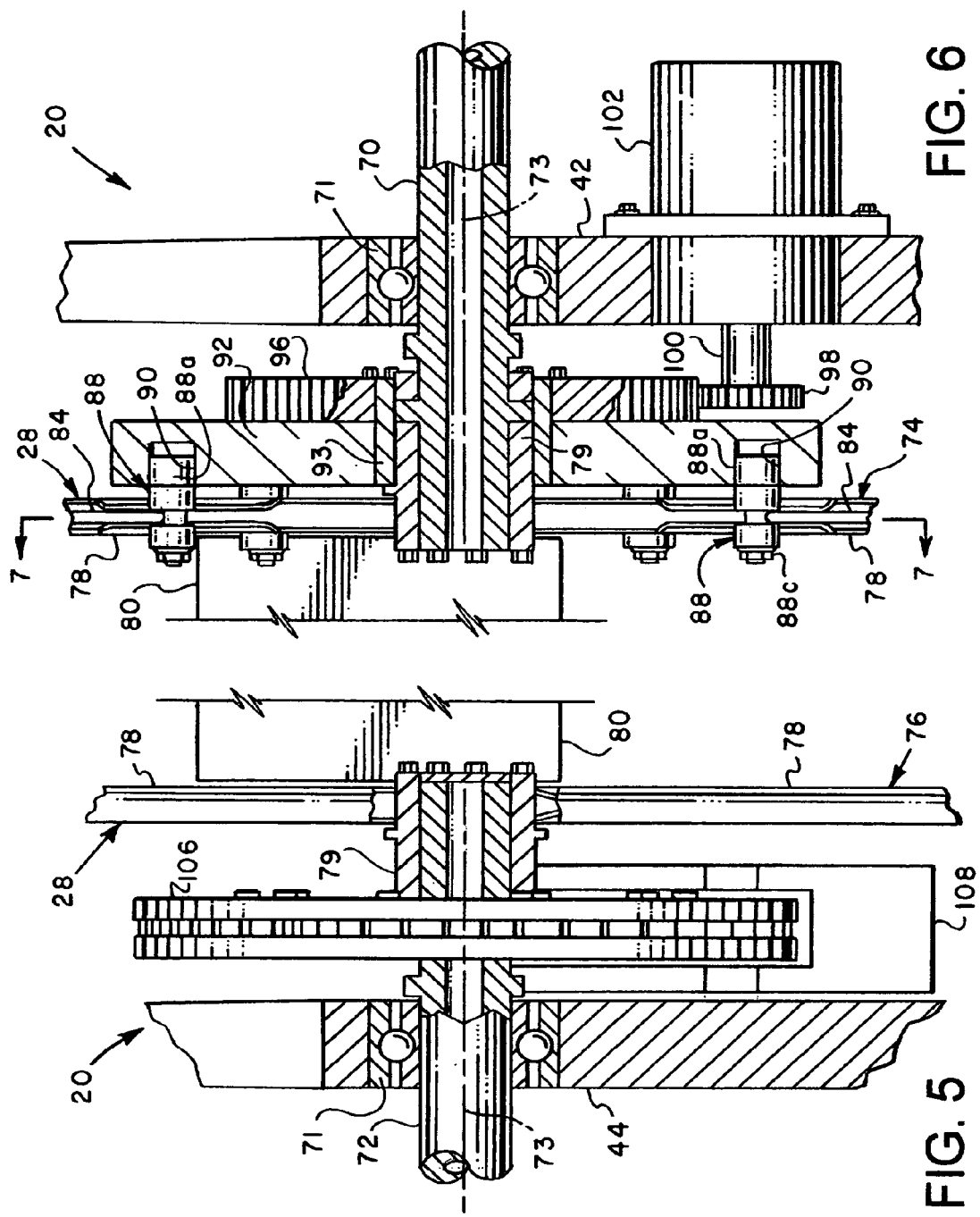

WIND DRIVEN POWER GENERATOR WITH MOVEABLE CAM

CROSS-REFERENCE TO RELATED APPLICATIONS

This patent application is a continuation-in-part application of co-pending U.S. Non-Provisional patent application Ser. No. 11/505,966, filed Aug. 17, 2006, and a non-provisional patent application of U.S. Provisional Patent Application No. 61/031,317, filed Feb. 25, 2008, both which are hereby incorporated by reference in their entirety.

BACKGROUND

Wind driven power generators are under intensive development as energy needs and the costs associated therewith continue to escalate. With the development of wind driven power generators certain needs have become apparent, including the need to provide a generator which overcomes the disadvantage of conventional airscrew or propeller type generators which must be mounted at a substantial height above the surface, are not aesthetically pleasing, are a hazard to airborne wildfowl, and are susceptible to ice accumulation on the propeller blades.

There has been a continuing need and desire for improvements in wind driven power generators, including the desire to overcome the shortcomings of conventional power generators such as those described hereinabove, while also providing a generator which is efficient, physically compact and is easily adapted to varying wind velocity conditions while retaining the capability of power generation. It is to these ends, as well as other desiderata and needs which will be apparent to those skilled in the art, that the present invention has been developed.

SUMMARY

The present invention provides an improved wind driven power generator.

The present invention also provides a wind driven power generator which includes a unique rotor or propeller configuration, is compact and less obtrusive than conventional airscrew or propeller type generators and includes a rotor which may be disposed within a shroud or duct for efficiency improvements while minimizing hazards to bird life and while being less susceptible to performance degradation or structural problems associated with ice or snow accumulation, for example.

In accordance with an important aspect of the present invention, a wind driven power generator is provided with a rotor having circumferentially spaced airfoil shaped blades which are arranged in a circular pattern not unlike a so-called paddle wheel and which have a mechanism associated therewith for varying the "lift" of the rotor blades to provide a resultant driving force in response to wind flowing thereover. Thus, the blades effect rotation of the rotor to provide a useful result, such as driving an electric power generator.

In accordance with another important aspect of the present invention, a wind driven power generator is provided which includes a rotor which is characterized by a unique multi-blade pitch change mechanism for varying blade pitch or angle of attack as the blades rotate about an axis generally parallel to the blade length. The multi-blade rotor may be adapted to be connected to one or two electric power generators, or other power generating devices, and the speed of the rotor may be controlled to provide for variable power output and/or at a selected electrical energy characteristic.

In accordance with still another important aspect of the present invention, a wind driven power generator is provided which includes a rotor comprising rotor blades which have an airfoil shape and wherein the camber or curvature of the airfoil may be varied. In this way the "lift" forces exerted by the rotor blades or vanes may be selectively converted into a resultant useful force for driving the rotor. An articulated rotor blade configuration, together with a blade camber change mechanism, provides the useful resultant force of the rotor exerted by the blades as the rotor rotates In accordance with yet a further aspect of the invention, a wind driven power generator is provided which includes rotor speed control means including an embodiment which is self-governing in relation to the velocity of wind flowing over the rotor.

In accordance with yet a further aspect of the present invention a wind driven power generator is provided wherein a rotor which is responsive to wind flowing thereover rotates within a duct or shroud to improve rotor efficiency, and minimize the adverse effects of rain, or snow or ice accumulation on the rotor or flow of such through the duct. The duct is particularly advantageous in that there are provided paths for the flow of cooling air over one or more electric generators connected to the rotor. Still further, the rotor duct or shroud is preferably configured to accelerate the flow of air through the duct and the duct is also configured to modify or improve the weather vaning tendency of the generator so that the duct opening is normally oriented to take advantage of the direction of the wind.

Those skilled in the art will further appreciate the above-mentioned advantages and superior features of the invention together with other important aspects thereof upon reading the detailed description which follows in conjunction with the drawings.

BRIEF DESCRIPTION OF THE DRAWINGS

FIG. 2 is a perspective view similar to FIG. 1 showing certain details of the power generator rotor and its support structure;

FIG. 5 is a detail section view taken generally along the line 6-6 of FIG. 4;

FIG. 6 is a detail section view taken generally along the line 6-6 of FIG. 4;

DETAILED DESCRIPTION

Figure 1:
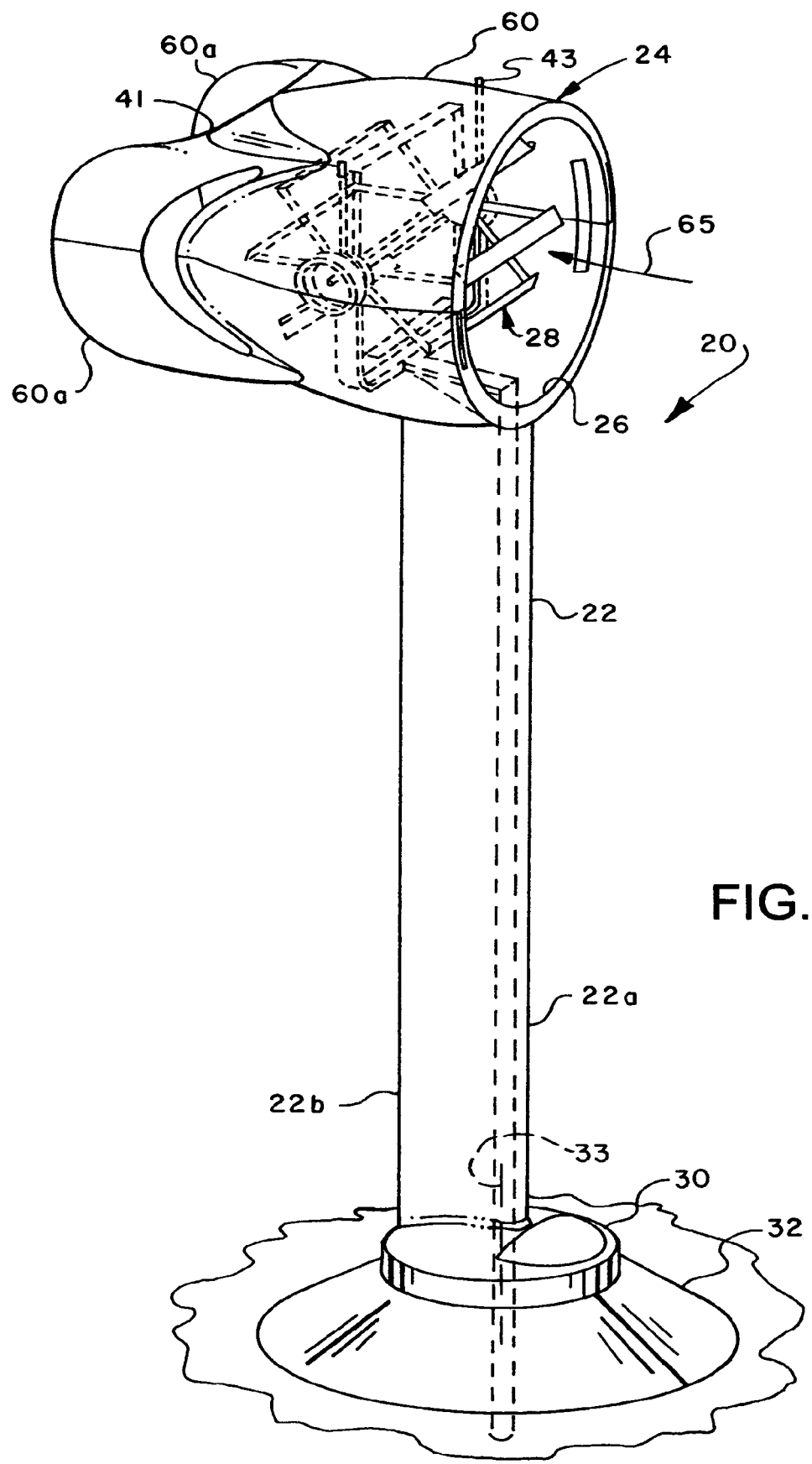
FIG. 1 is a perspective view of one preferred embodiment of a wind driven power generator in accordance with the invention.

In the description which follows, like parts are marked throughout the specification and drawings with the same reference numerals, respectively. The drawing figures may not be to scale and certain features may be shown exaggerated in scale or in somewhat schematic form in the interest of clarity and conciseness.

Referring to FIG. 1, there is illustrated a wind driven power generator in accordance with the invention and generally designated by the numeral 20. The power generator 20 is characterized by a vertically extending mast 22, preferably having a symmetrical airfoil shape in cross section, and supporting a generally cylindrical duct or shroud 24. Duct 24 has an air inlet 26 defining an opening oriented to allow natural air currents or wind to flow through said opening for propelling or driving a rotor, generally designated by the numeral 28. Rotor 28 may be of a type similar to that disclosed and claimed in my co-pending U.S. patent application Ser. No. 11/411,540 filed on Apr. 26, 2006, the subject matter of which is incorporated herein by reference. However, the rotor 28 is adapted for rotation about a substantially horizontal axis within the duct 24 in response to natural air currents or wind flowing through the duct. Mast 22 is mounted on a generally cylindrical base member 30 which is supported for rotation on a foundation member 32. An axis of rotation of the mast 22 with respect to foundation member 32 is indicated at 33 and such axis is disposed closer to a leading edge 22a of mast 22 than a trailing edge 22b. In this way the mast 22 will tend to weathervane or rotate such that the duct inlet opening 26 is aligned with the direction of wind blowing over the generator 20. Base 30 supports the mast 22 for relatively free rotation on foundation 32 by suitable bearing means interposed the base and the foundation.

Referring to FIG. 2, the generator 20 is further characterized by a frame 36 including a generally upstanding column member 38 disposed within and connected to mast 22 but extending downwardly through the base 30 and the foundation 32 to a suitable bearing or receptacle 37 disposed below grade and within an earth formation 38, as illustrated. Receptacle 37 and frame 36 are electrically conductive and serve to conduct any cloud-to-ground or ground-to-cloud lightning which may affect operation of the generator 20.

Frame 36 includes a substantially horizontally extending arm 40 supporting spaced apart upstanding frame members 42 and 44 which are adapted to support rotor 28 in a manner to be described in further detail herein. Respective lightning rods 41 and 43, FIG. 2, are preferably provided mounted on frame members 42 and 44. As shown in FIG. 2, rotor 28 is drivingly connected to spaced-apart opposed electric generators 46 and 48 whereby electricity generated by the generators 46 and 48 may be conducted by conductor means 47 and 49 via a junction box 50 and further conductor means 51 and 52 to a power takeoff or slip ring assembly disposed on and between the base 30 and the foundation 32. As illustrated in FIG. 2, concentric slip rings 54 and 56 on foundation 32 are adapted to receive power from brushes 54a and 56a mounted on base 30 and connected to conductor means 51 and 52, for example.

Figure 3:
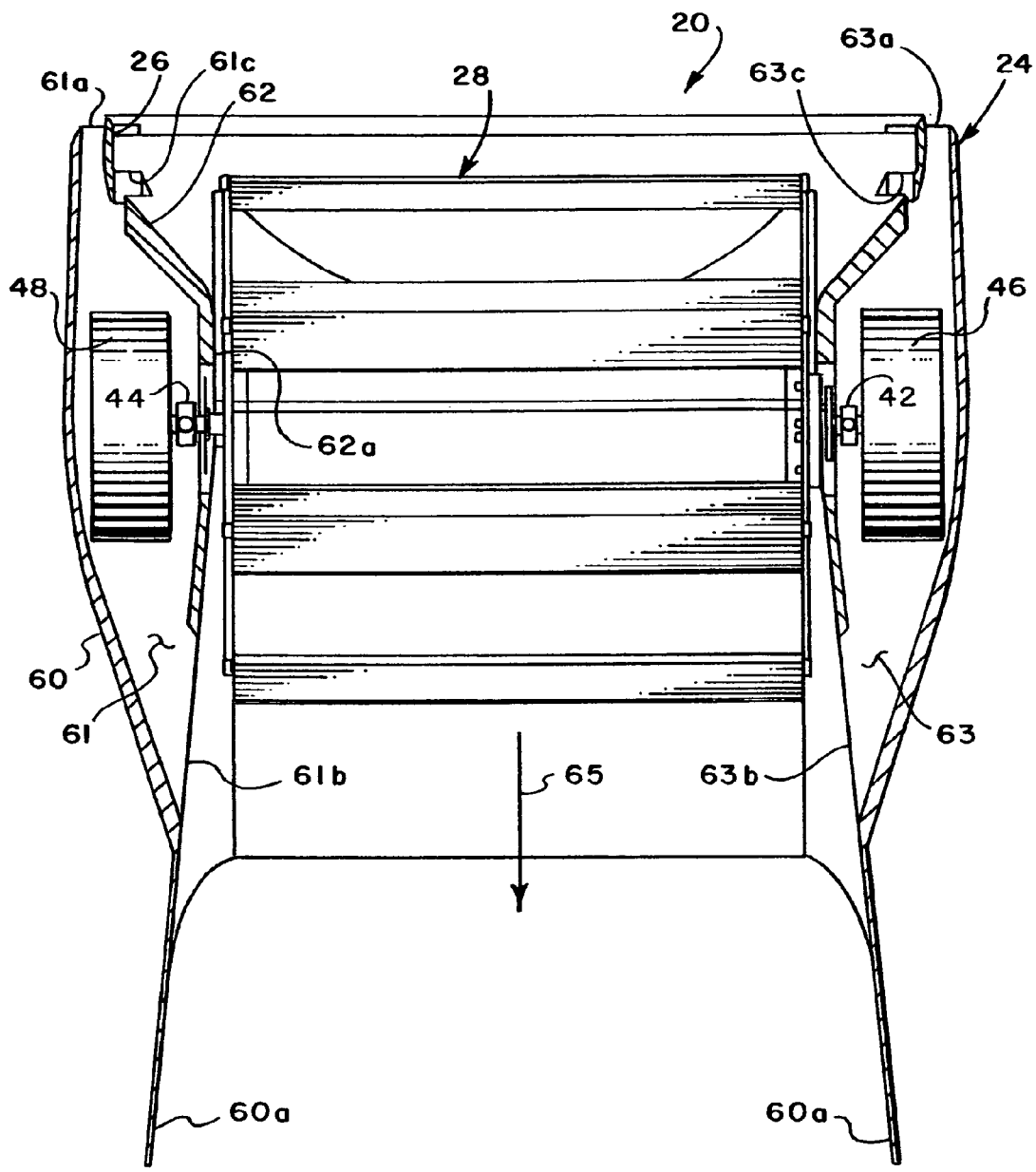
FIG. 3 is a detail section view taken generally along the line 3-3 of FIG. 2.

Referring now to FIG. 3, further details of the duct 24 are illustrated including a preferred configuration wherein the duct includes an outer, generally cylindrical shroud member 60 generally spaced from but disposed in supportive relationship with an inner, generally cylindrical shroud member 62. Shroud or duct member 62 is characterized by a venturi shaped wall defining a throat or minimum diameter section 62a at which rotor 28 is disposed, generally. At least portions of shroud member 62 are spaced from shroud member 60, as shown, to provide opposed longitudinal passages 61 and 63 which have air inlet openings at 61a and 63a at the duct inlet 26 and exhaust openings at 61b and 63b downstream of rotor 28 with respect to the direction of wind flow through the duct 24, which wind flow direction is indicated by the arrow 65 in FIG. 3. Accordingly, generators 46 and 48 are disposed within the respective cooling air flow passages 63 and 61 whereby heat generated during operation of the generators may be dissipated by a natural flow of ambient air through the passages 61 and 63. As shown in FIGS. 1 and 3, outer duct member 60 is also provided with spaced apart rearwardly projecting vanes 60a which assist the mast 22 in orienting the duct 24 to be aligned with the direction of wind. Secondary cooling air inlets 61c and 63c may be provided in the inner duct or shroud member 62, as indicated also in FIG. 3.

Figure 4:
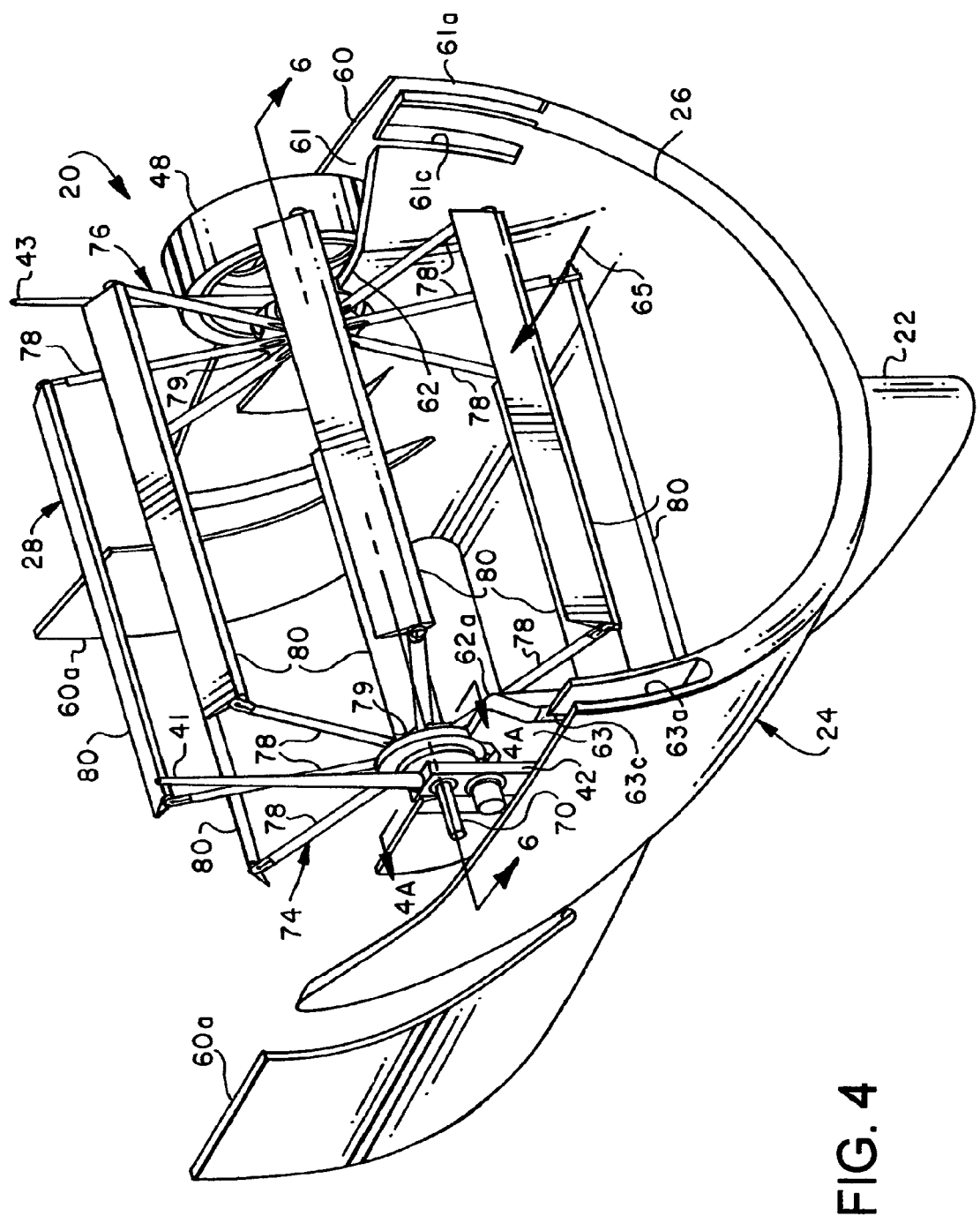
FIG. 4 is a cutaway perspective view showing a portion of the rotor support structure and the rotor pitch change control mechanism.
Figure 4A:
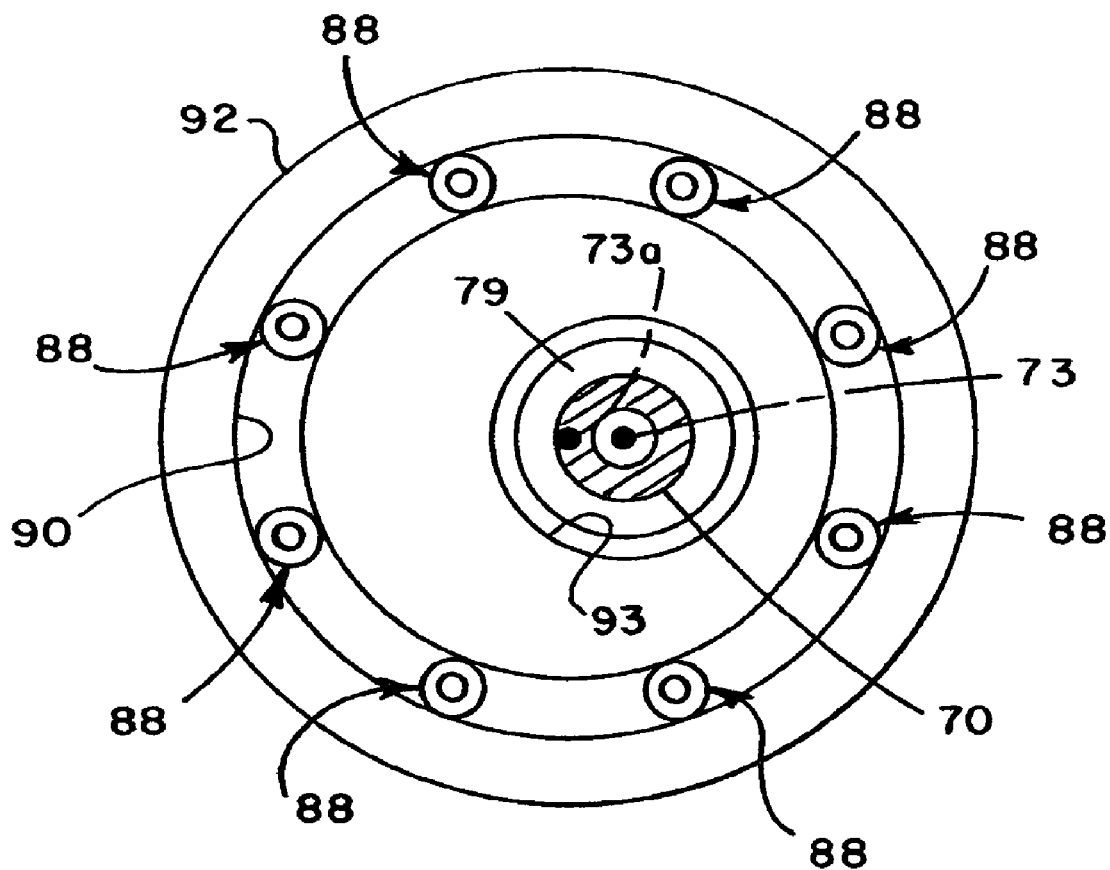
FIG. 4A is a detail view taken from line 4A-4A of FIG. 4.

Referring now to FIGS. 4, 4A, 5 and 6, the rotor 28 is mounted for rotation on the support members 42 and 44 by respective shaft members 70 and 72, FIGS. 5 and 6, which are also directly connected to the respective electric generators 46 and 48. In FIG. 4 the generator 46 is omitted for the sake of clarity and the generators 46 and 48 have been omitted from the illustrations of FIGS. 5 and 6 also for clarity and convenience. The rotor 28 is characterized by spaced-apart assemblies of circumferentially spaced, radially extending arms or spokes, which assemblies are designated by numerals 74 and 76, respectively. Arm assemblies 74 and 76 are characterized by circumferentially spaced, radially extending airfoil shaped tubular arm or spoke members 78 which are equally spaced and are each connected to a hub 79, see FIGS. 5 and 6. Hubs 79 are mounted on shafts 70 and 72 for rotation therewith, respectively. As shown in FIGS. 5 and 6, shafts 70 and 72 are supported in suitable rolling element bearing assemblies 71 mounted in suitable bores in the respective frame support arms 42 and 44. The support arms 78 of the respective arm assemblies 74 and 76 are aligned with each other and are operable to support therebetween elongated airfoil shaped, generally parallel, rotor blades 80, which total eight in number for the rotor 28. Rotor blades 80 include a leading edge 80a and a trailing edge 80b, respectively, FIG. 7.

Figure 7:
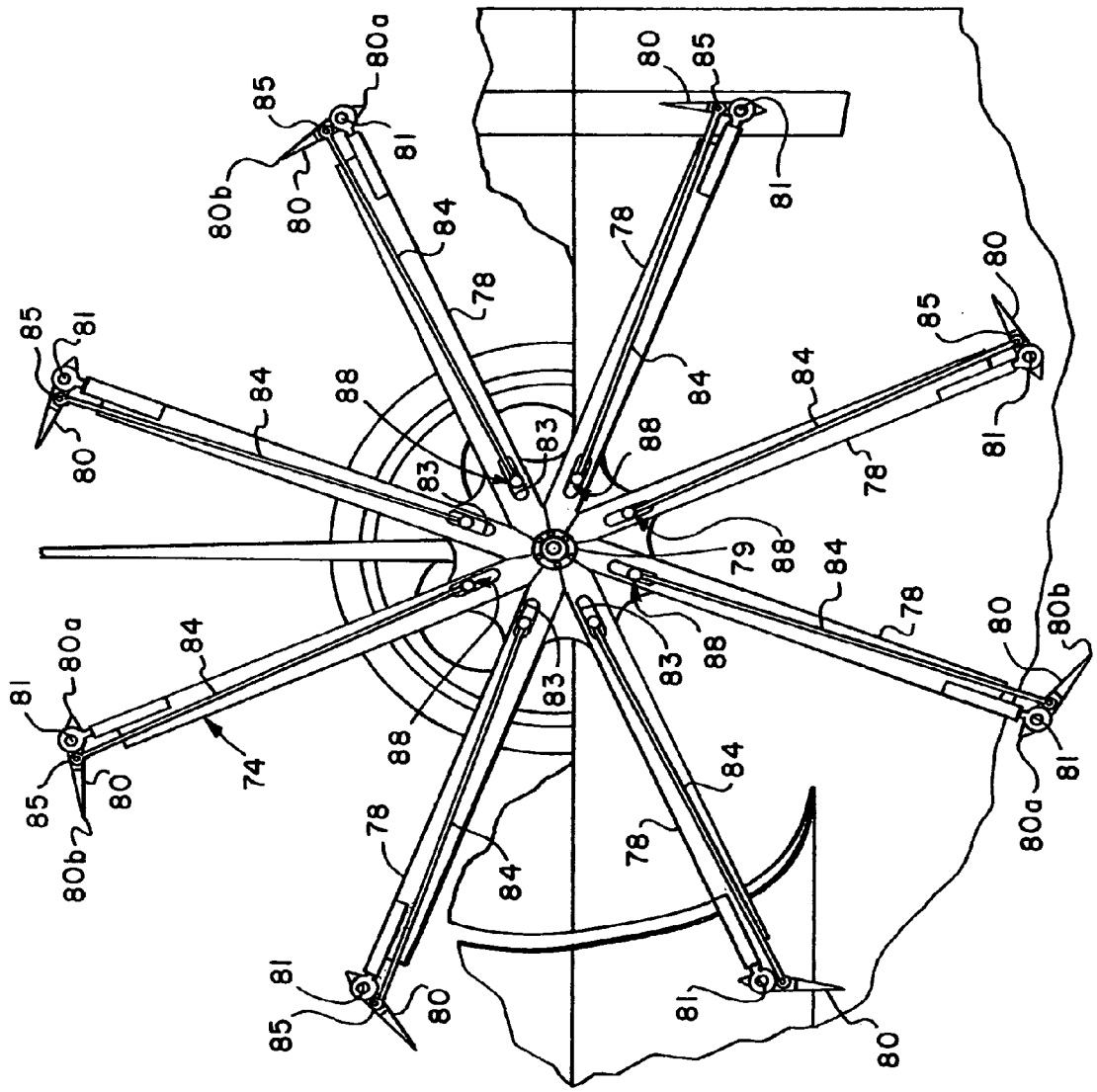
FIG. 7 is a detail section view taken generally along the line 7-7 of FIG. 6.

For a rotor having eight blades 80, the blades, preferably, have an aspect ratio in a range of 6:1 to 20:1 and a symmetrical airfoil shape although other airfoil shapes, such as provided by a variable camber blade, may be suitable. For a sixteen blade rotor, the aspect ratio may be in a range of 4:1 to 15:1. Rotor blades 80 are mounted for pivotal movement on the respective arms 78 substantially at the distal ends of the arms, as illustrated in FIG. 7, and whereby each end of each rotor blade 80 is mounted at a pivot 81. Rotor blades 80 are mounted at their opposite ends at pivots 81 of each tubular arm 78 of the respective are assemblies 74 and 76 as shown by example in FIG. 7.

The rotor 28 includes rotor blade "lifting" force control means described herein below. Referring further to FIG. 7, in one preferred embodiment, each arm 78 of arm assembly 74 is also provided, generally at its radially inward end with elongated slots 83 for receiving suitable cam followers 88 to be described further herein. Cam followers 88 are each, respectively, connected to an elongated blade pitch change link 84. Links 84 are disposed within the hollow interiors of the respective arms 78 and are connected at their outer distal ends to the blades 80 at pivot connections 85, respectively, and whereby, in response to generally linear longitudinal movement of the links 84, the pitch angle or angle of attack of the respective blades 80 and, hence, the blade lift forces may be varied in accordance with the teaching of the above-referenced patent application Ser. No. 11/411,540.

Referring to FIG. 6, there is illustrated the inner ends of two of the links 84 and connected to two respective cam followers 88. Cam followers 88 are also disposed partially in a circular groove or recess 90 formed in a generally circular or cylindrical disk cam member 92 mounted on hub 79 but disposed on suitable bearing means 93 to allow rotation of the hub 79 relative to the cam 92, see FIG. 4A also. As shown further in FIG. 4A, circular groove 90 of cam 92 has a central axis 73a which is parallel to but eccentric with respect to the axis of rotation 73 of the shafts 70 and 72. Axis 73 is also indicated in FIGS. 5 and 6, respectively. Cam 92 is connected to a gear 96, FIG. 6, which is meshed with a pinion 98 connected to the output shaft 100 of a motor 102 which is adapted to rotate the cam 92 into selected positions to effect varying the pitch or angle of attack of the blades 80 with respect to the direction of the wind flowing through the duct 24 as the rotor 28 rotates about axis 73. By selectively varying the pitch or angle of attack of the rotor blades 80, the generator 20 may efficiently utilize wind flow through duct 24 to rotate the rotor 28 and generate electrical power by way of the respective generators 46 and 48.

Referring briefly to FIG. 5, the shaft 72, on which hub 79 for arm assembly 76 is mounted, also supports for rotation therewith a brake disk 106 which is operable to be engaged by a suitable caliper mechanism 108 to brake the rotation of the rotor 28 to control the rotative speed thereof so as to effectively generate electricity, for example, with the generators 46 and 48 at a selected frequency as well as at a predetermined power output. Accordingly, the motor 102 may be operated to rotate the cam 92 to selected positions for changing the angle of attack or pitch of the rotor blades 80 while the rotor 28 may also be controlled as to its speed of rotation about the axis 73, as desired, independent of the effects of blade pitch control.

Figure 8:
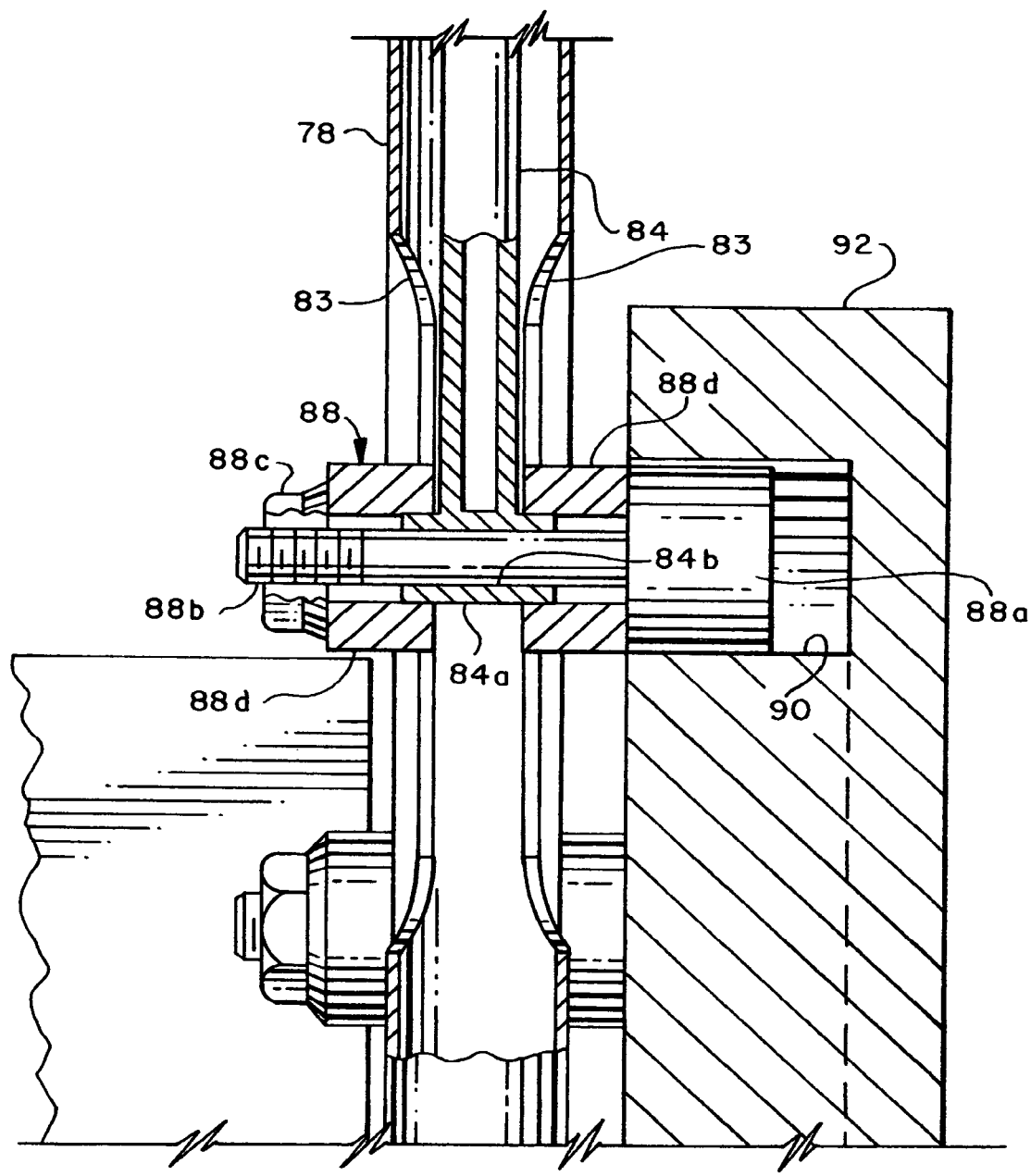
FIG. 8 is a detail section view similar to a portion of FIG. 6 but on a larger scale to illustrate the configuration of one of the cam followers and its connection with the rotor pitch change control linkage.

Referring briefly to FIG. 8, details of one of the cam followers 88 are illustrated. Cam followers 88 each include a generally cylindrical follower part 88a disposed within the groove 90 of cam 92 for traversal therein. A shank 88b extends axially from the follower part 88a. Pitch control links 84 each include a transverse pivot sleeve part 84a formed thereon and including a bore 84b adapted to receive the cam follower shank 88b. Generally cylindrical annular guide members 88d are sleeved over the shank 88b, journaled on the transverse link part 84a and are retained in assembly with the link 84, as illustrated, by a threaded nut 88c. Members 88d are of a diameter slightly less than the width of the grooves or slots 83 for guidance therewithin.

Figure 9:
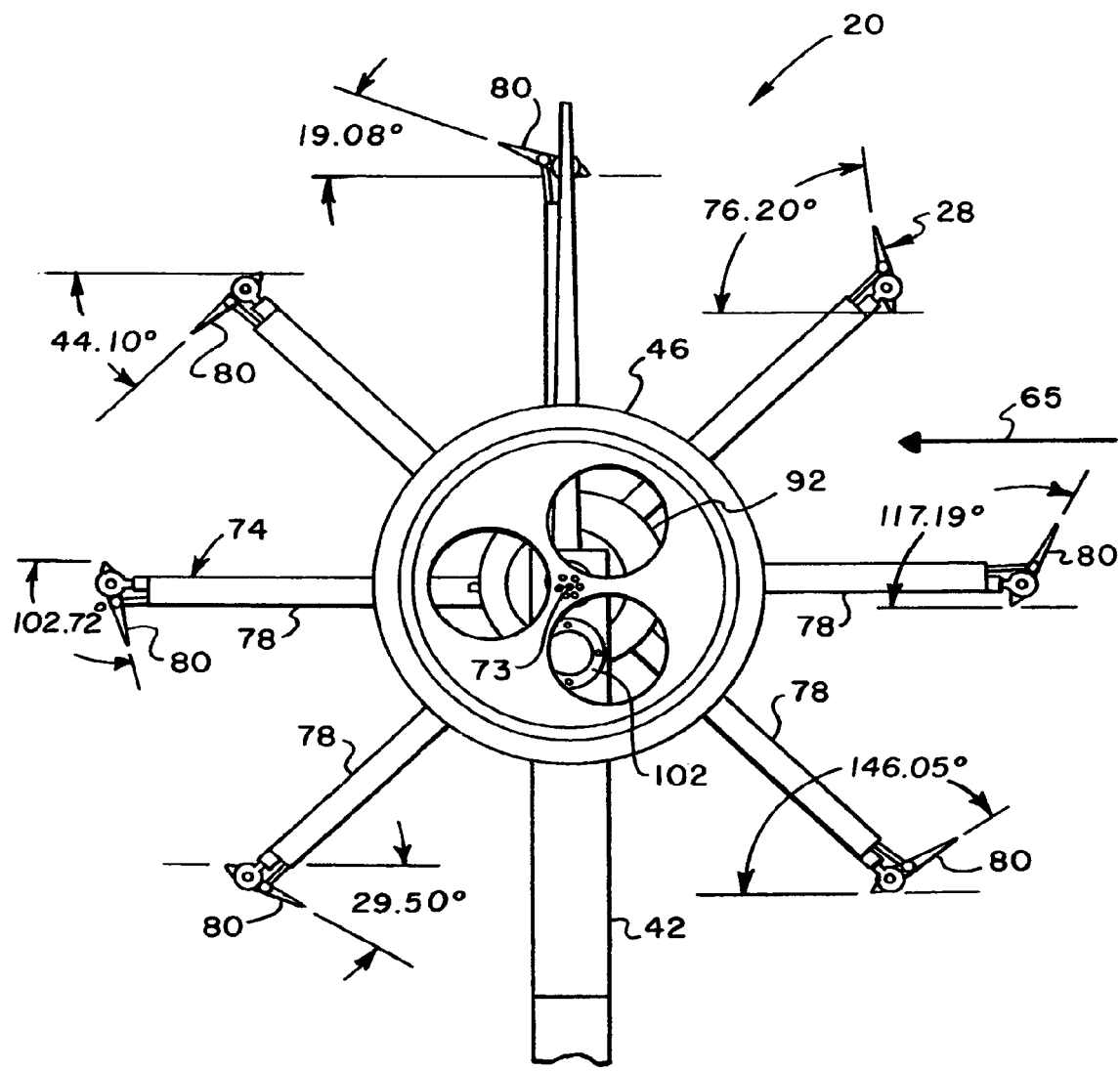
FIG. 9 is a somewhat schematic view of the rotor blades showing the positions of the blades in a so-called full stall condition of the rotor.
Figure 10:
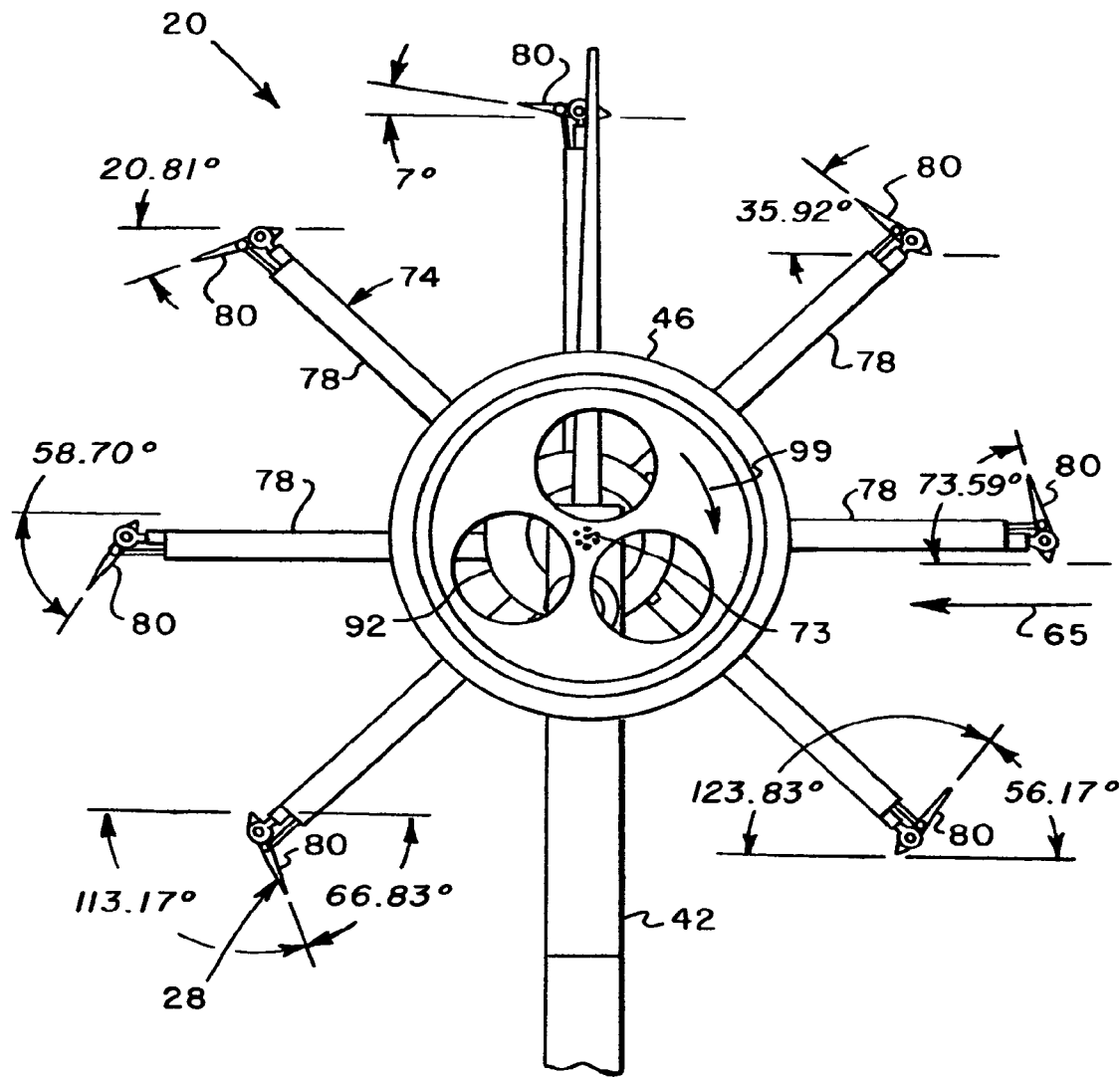
FIG. 10 is a view similar to FIG. 9 but showing the angle of attack or pitch of the rotor blades in a so-called zero angle or maximum performance condition.

Referring now to FIG. 9, there is illustrated a condition of the rotor 28 wherein the blades 80 are disposed in positions corresponding to a so-called full stall condition wherein blade "lift" forces and a net resultant force acting on the rotor by wind flowing through the duct inlet 26 in the direction of arrow 65 will not effect rotation of the rotor. This is one limit position of the cam 92 as it is rotated by the drive motor 102. FIG. 10, on the other hand, shows a condition of the rotor 28 wherein the blades 80 have assumed positions, respectively, which will produce a maximum resultant force tending to turn the rotor in a clockwise direction, viewing FIG. 10 in response to air flowing in the direction of arrow 65. Exemplary blade angles with respect to wind direction, indicated by arrow 65, for the rotor positions shown in FIGS. 9 and 10 one indicated in the drawing figures. The clockwise direction of rotation of the rotor 28 about the axis 73 is also indicated by the arrow 99 in FIG. 10. In FIGS. 9 and 10, the rotor blade angles indicated are, of course, for the particular positions of the respective blades 80, as illustrated, and the pitch angles vary continuously with respect to arms 78, for example, as the rotor 28 rotates.

Figure 11:
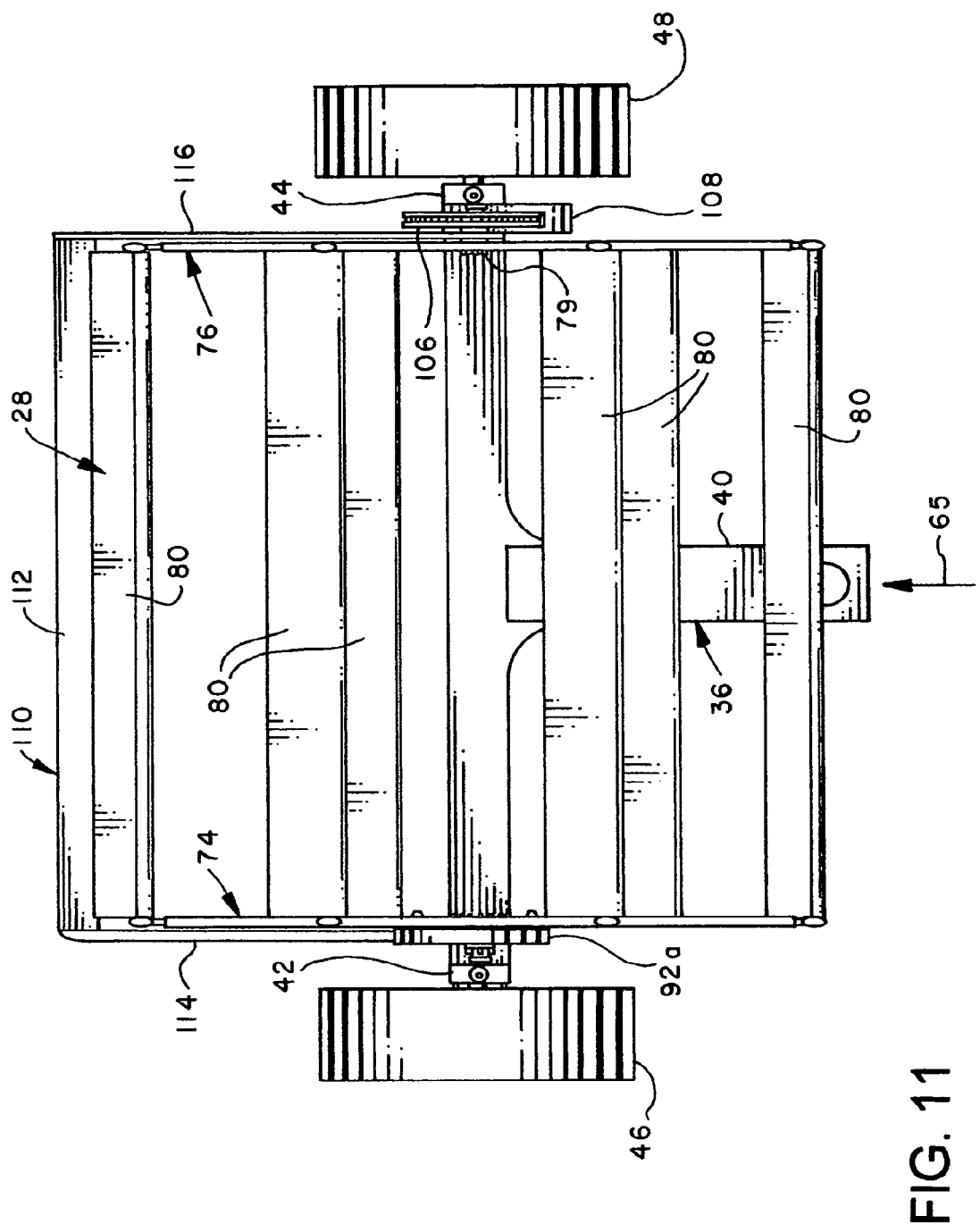
FIG. 11 is a top plan view of another preferred embodiment of a rotor for a wind driven power generator in accordance with the invention.
Figure 12:
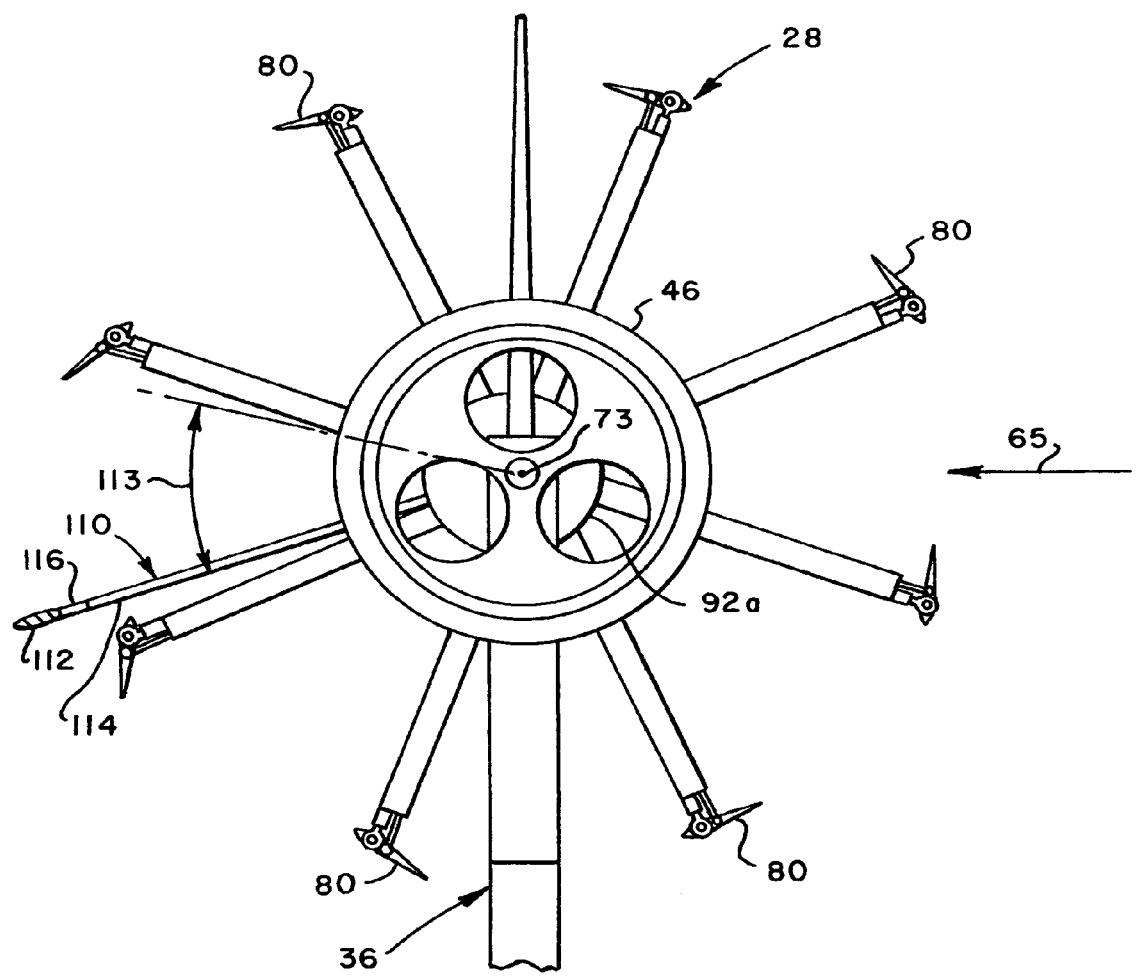
FIG. 12 is a side-elevation of the rotor embodiment shown in FIG. 11.

Referring now to FIGS. 11 and 12, an alternate embodiment of a power generator in accordance with the invention is illustrated showing a modification to the control mechanism for changing the pitch or angle of attack of the rotor blades 80. In FIGS. 11 and 12 there is illustrated the rotor assembly 28 drivingly connected to the generators 46 and 48 and supported on the arms 42 and 44 of the support frame 36. However, in the embodiment illustrated in FIGS. 11 and 12, the circular cam 92 has been replaced by a modified version of the cam, generally designated by the numeral 92a. Cam 92a is supported for rotation about axis 73 and its circular cam groove is also eccentric with respect to that axis. Cam 92a is also supported on the shaft 70 in generally the same manner as illustrated in FIG. 6.

The power generator embodiment illustrated in FIGS. 11 and 12 includes a self-governing wind vane assembly 110 including a transversely extending airfoil or vane 112 supported on spaced-apart arms 114 and 116. Arm 114 is connected to cam 92a and arm 116 is preferably mounted for rotation on and with respect to hub 79 of arm assembly 76 adjacent brake disk 106. Accordingly, the wind vane assembly 110 is free to rotate about axis 73 within the limits of an arc, as indicated by the arrow 113 in FIG. 12, for example. As the vane assembly 110 rotates in a clockwise direction, viewing FIG. 12, the cam 92a is rotated to a position which will tend to move the pitch of the rotor blades 80 in a direction which will result in less of a resultant force tending to rotate the rotor 28 in a clockwise direction, viewing FIG. 12. Accordingly, as wind velocity increases, in the direction of the arrow 65 in FIGS. 11 and 12, the pitch change control mechanism of the embodiment illustrated, being self-governing, will tend to reduce the resultant force effecting rotation of the rotor 28 and thus control the speed and output effort of the rotor. In all other respects the embodiment illustrated in FIGS. 11 and 12 is substantially like the embodiment illustrated in FIGS. 1 through 10.

Figure 13:
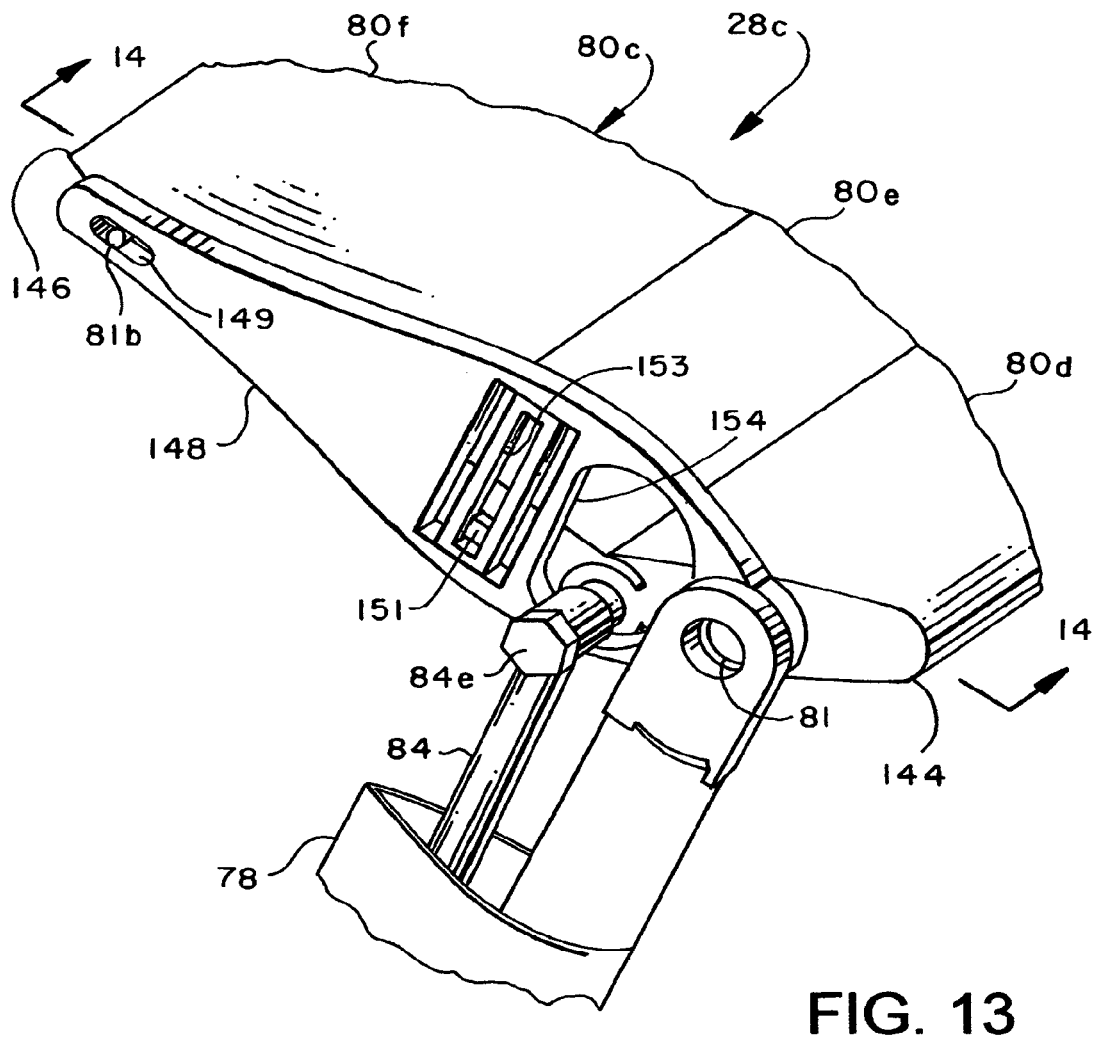
FIG. 13 is a perspective view of a modified rotor and blade configuration including blade camber change mechanism in accordance with another preferred embodiment of the present invention.
Figure 14:
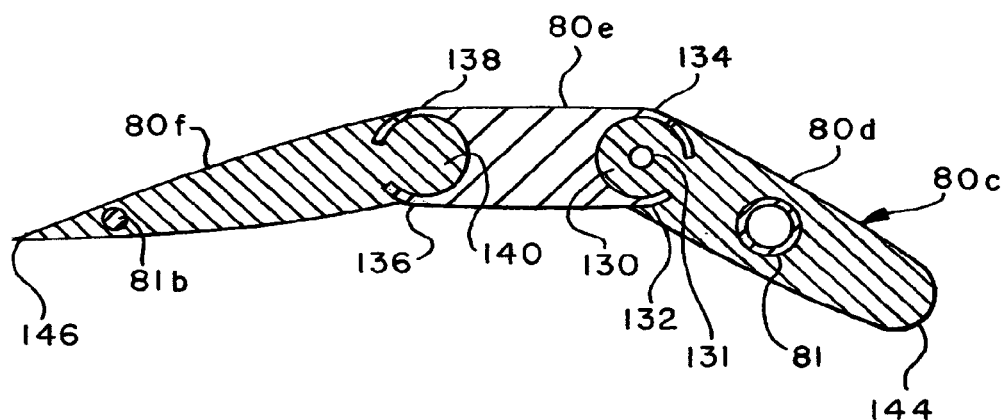
FIG. 14 is a detail section view taken generally along the line 14-14 of FIG. 13.

Referring now to FIGS. 13 and 14 another embodiment of the invention is illustrated wherein a modified rotor 28c is characterized by variable camber blades 80c, a portion of one being shown in both FIGS. 13 and 14. Variable camber blade 80c includes interconnected blade sections 80d, 80e and 80f which are hingedly connected to each other at hinge structure including an elongated hinge boss 130, FIG. 14, formed on the front or leading edge blade section 80d. Hinge boss 130 is fitted in a recess formed by opposed arcuate rim portions 132 and 134 formed on intermediate airfoil or blade section 80e. A second set of arcuate rim portions 136 and 138 extend parallel to the rim portions 132 and 134 and define a second recess for receiving a hinge boss 140 of trailing edge blade section 80f. Accordingly, the blade sections 80d, 80e and 80f are adapted for limited pivotal movement with respect to each other along axes parallel to the longitudinal axis of blade 80c whereby the camber of blade 80c may be varied between its leading edge 144 and its trailing edge 146, as shown in FIGS. 13 and 14. Variable camber blade 80c is mounted between opposed blade end section members 148, one shown in FIG. 13, and is pivotally connected thereto at pivot 81 formed on leading edge section 80d and a pivot member 81b projecting from the side edge of trailing edge section 80f. Pivot 81b is slidable in a slot 149 formed in blade end section 148 as shown in FIG. 13.

Referring further to FIG. 13, intermediate blade section 80e includes a longitudinally projecting tab part 151 which is slideable in a slot 153 extending substantially normal to the chord line of variable camber blade 80c. Accordingly, variable camber blade 80c may be mounted on rotor arms 78, one shown in FIG. 13, in place of the blade 80 and connected to link 84 at a pivot connection formed by a hexhead shoulder screw 84e, FIG. 13, disposed in a suitable bore 131 formed in hinge boss 130 of leading edge section 80d, see FIG. 14. Accordingly, as the rotor 28c rotates the camber of the 80c varies to vary the lift forces exerted by the respective blades 80c by selectively changing the configuration of the airfoil formed by the blades 80c wherein an airfoil configuration having a substantial amount of positive camber, as illustrated in FIG. 14, may be changed to an airfoil actually having negative camber, as indicated in FIG. 13. Although FIG. 14 is taken generally along the line FIG. 14-14 of FIG. 13 the condition of the blade 80c shown in FIG. 14 is with the blade having substantial positive camber. In the condition of the blade 80c shown in FIG. 13, the blade has somewhat negative camber. As shown in FIG. 13, a suitable recess or slot 154 is formed in blade end section 148 to accommodate movement of the fastener 84e interconnecting the link 84 with the leading edge section 80d of rotor blade 80c. Thus, the lifting forces exerted by a series of blades 80c used in place of the blades 80 are varied as a rotor 28c rotates due to the action of the linkages 84 selectively moving the blades 80c to change their airfoil configuration or camber whereby the resultant driving force of rotor 28c may be provided and varied.

Figure 15:
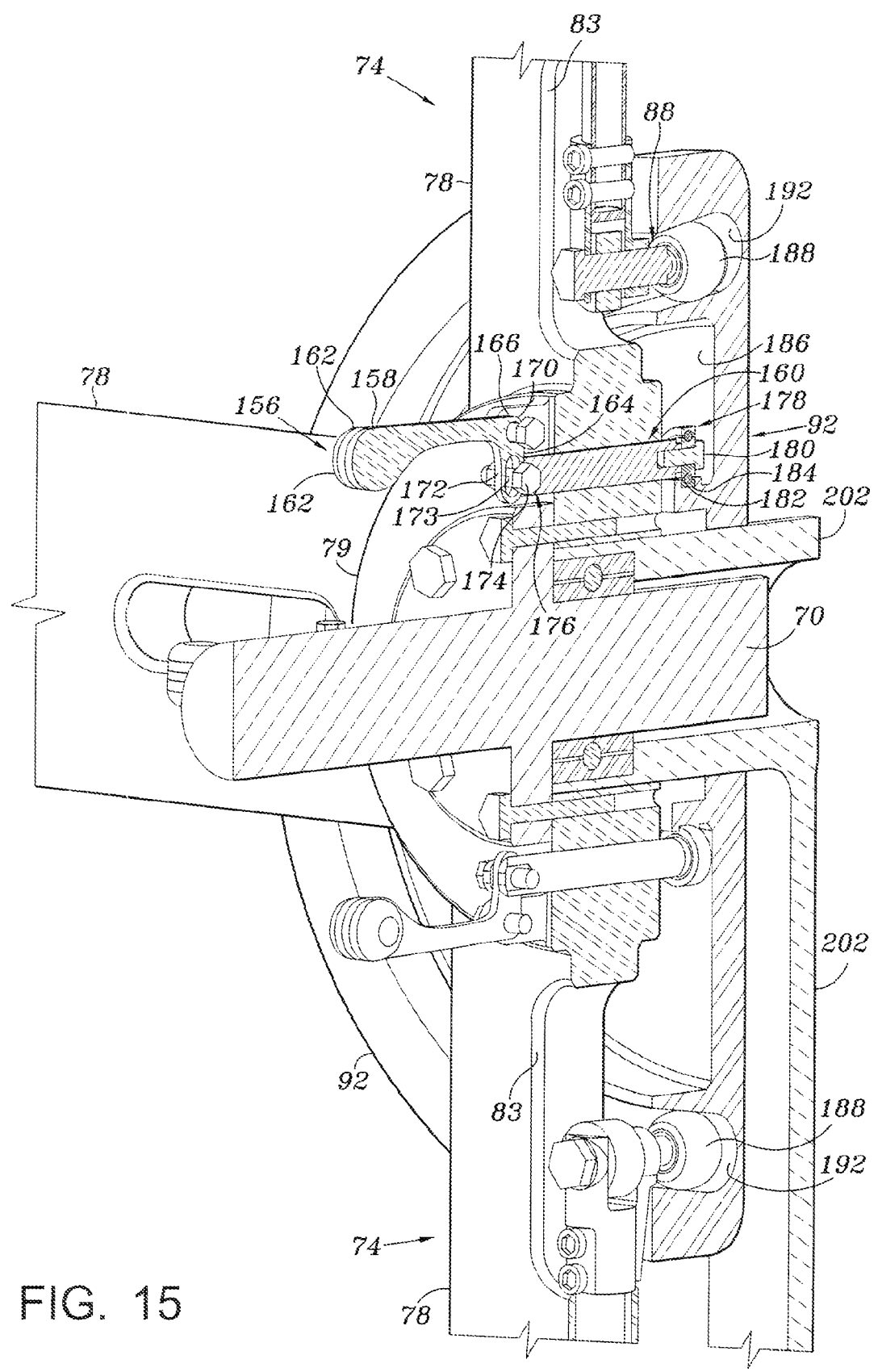
FIG. 15 is a partial sectional perspective view of the wind turbine power generator with a modified cam with the governor mechanism in an intermediate position.

In the embodiment illustrated in FIGS. 15 through 20, a mechanism 156 is provided for governing the rotational velocity of the turbine 20 to maximize its efficiency and to reduce undesirable strain that may be observed at undesirable wind velocities, particularly where excessive turbulence arises. Referring to FIGS. 15 through 19, governing mechanism 156 comprises an arm 158 and a linkage 160 that is operably connected to the cam 92. The governing mechanism arm 158 includes a first end or head 162 and a curved second end or tail 164, and the first end as shown is enlarged relative to the second to provide a greater mass. It is contemplated that the first end can be made of a more dense material than the second end so that both ends could be of similar size. The mass of the first end relative to the second may be varied upon the sensitivity desired for modulating the rotational velocity of the rotor. The tail 164 of the arm has an "L"-shaped portion 166 forming a pivot point 170 and linkage attachment end 172, where the pivot point is secured to an extension 168 of the arm member and the linkage attachment end is connected to the linkage that is in turn connected to the cam. The linkage attachment end, as shown in FIG. 15, and in more detail in FIG. 20, preferably has a receiving slot 173 for a fastener 174, such as a bolt as shown, although any suitable fastener known to one of ordinary skill is acceptable. The linkage 160 has two ends that can be referred to as an arm attachment end 176 and a cam attachment end 178. The arm attachment end, like the arm's linkage attachment end 172, as shown, may also include a receiving slot for accepting a fastener. In the embodiment illustrated in FIG. 15, the cam attachment end 178 includes a head portion 180 having an outwardly projecting ring or overhang 182 that fits into a gap or slot 184 in a side of the cam central recess 186 although the cam attachment end may be attached to the cam by any suitable means known to one of ordinary skill in the art. The linkage extends through the hub 79 and holds arm member 78 against the cam 92. As the arm member rotates faster about the shaft 70, the arm head 162 of the governor mechanism 156 moves outwardly with respect to shaft 70 about arrow 157 via centrifugal forces causing the second end or tail 164 causing relative displacement of the cam 92 in relation to the arm assembly. Although a multiplicity of governor mechanisms is shown in FIG. 15, and opposing pairs shown in FIGS. 16 and 17, a continuous ring fixedly attached to the arm member is acceptable, as well as any symmetrically positioned arrangement about the hub's circumference, to mitigate weight imbalances is suitable.

Further discussion of cam follower 88 and cam groove 90 is now made with reference to FIGS. 15 through 20. As noted, the arm assembly is connected for adjustable rotor blade angle of attack and is accessible in elongated slot 83 at its proximal end via cam follower 88 which depends substantially normally from the proximal end of the arm assembly. Cam follower 88 includes a cam follower interface or head 188 (shown as a partially spherical body or ball) for fitted engagement of cam groove 90 formed in the cam 92. As shown in FIGS. 16 through 20, the interface 188 (substantially similar to cam follower part 88a discussed referred to above) has a central opening that cam follower 88 extends therethrough so as to receive a fastener 190 that holds the interface in position relative to the cam follower. The interface may rotate about the cam follower or it may be fixedly attached thereto, or the cam follower and the interface may integrally formed.

Figure 16:
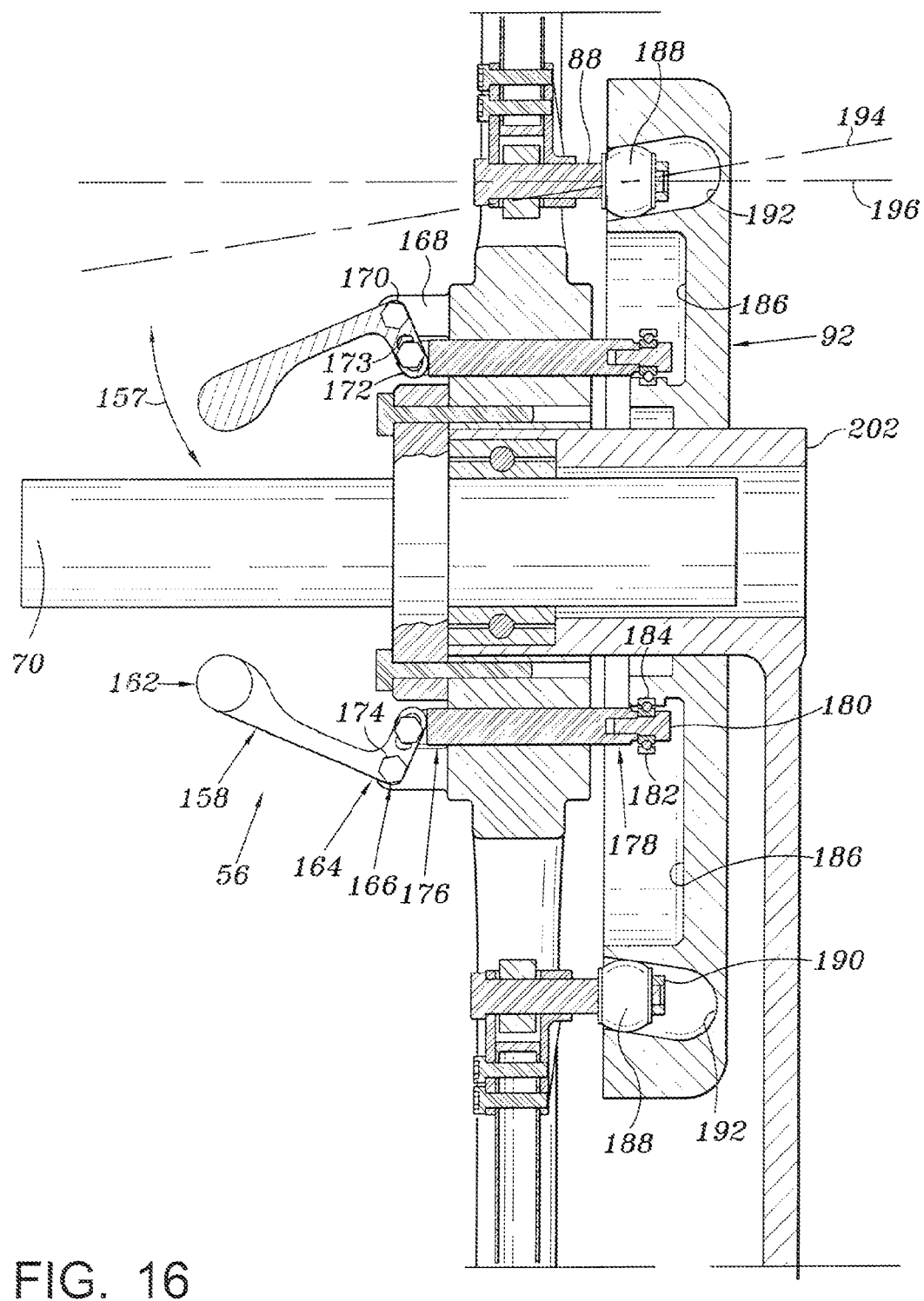
FIG. 16 is a sectional view of the cam and governing mechanism shown in FIG. 15.
Figure 17:
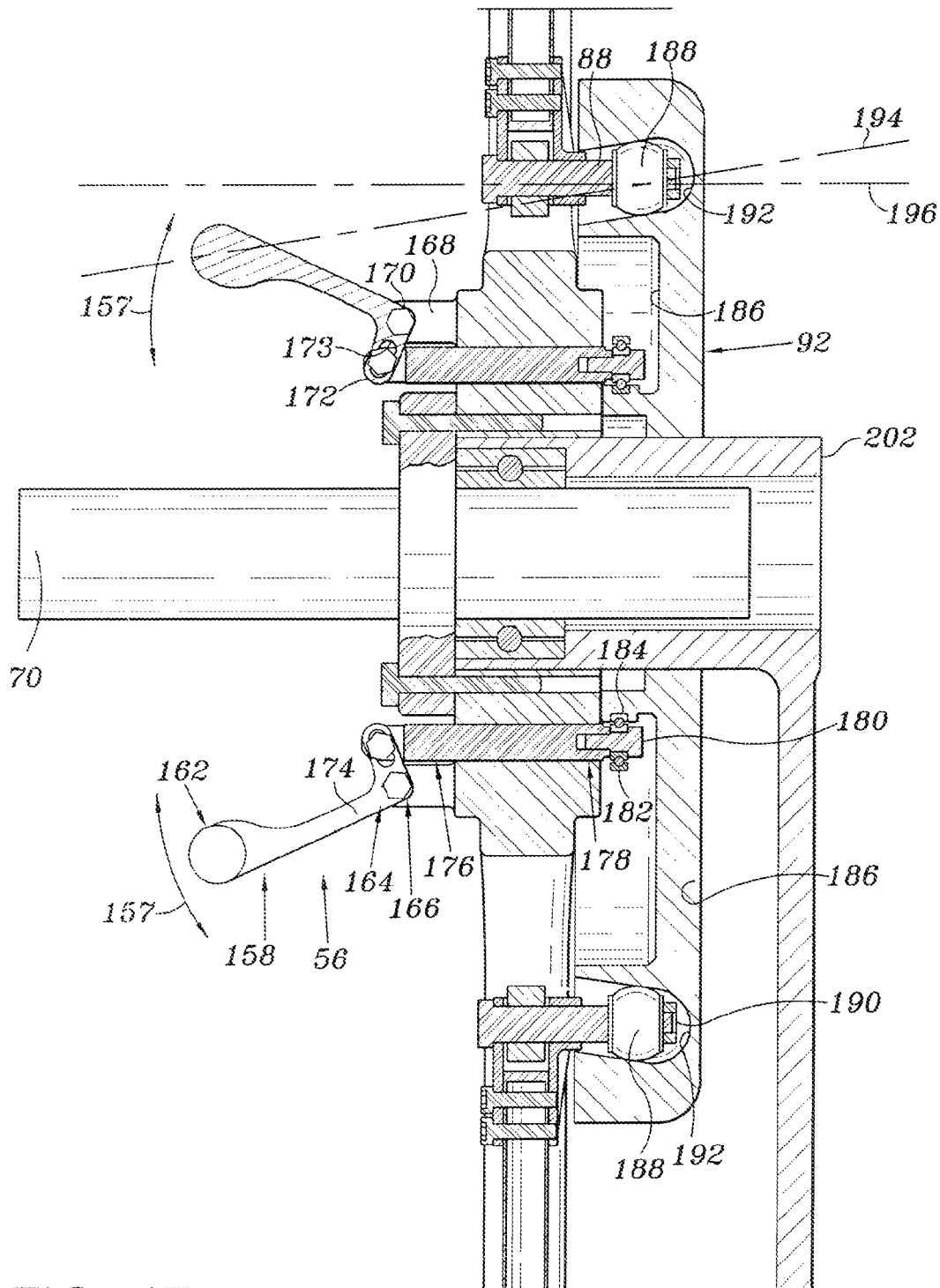
FIG. 17 is a section view of the cam and governing mechanism shown in FIGS. 15 and 16 with the governor mechanism rotated outwardly.
Figure 18:
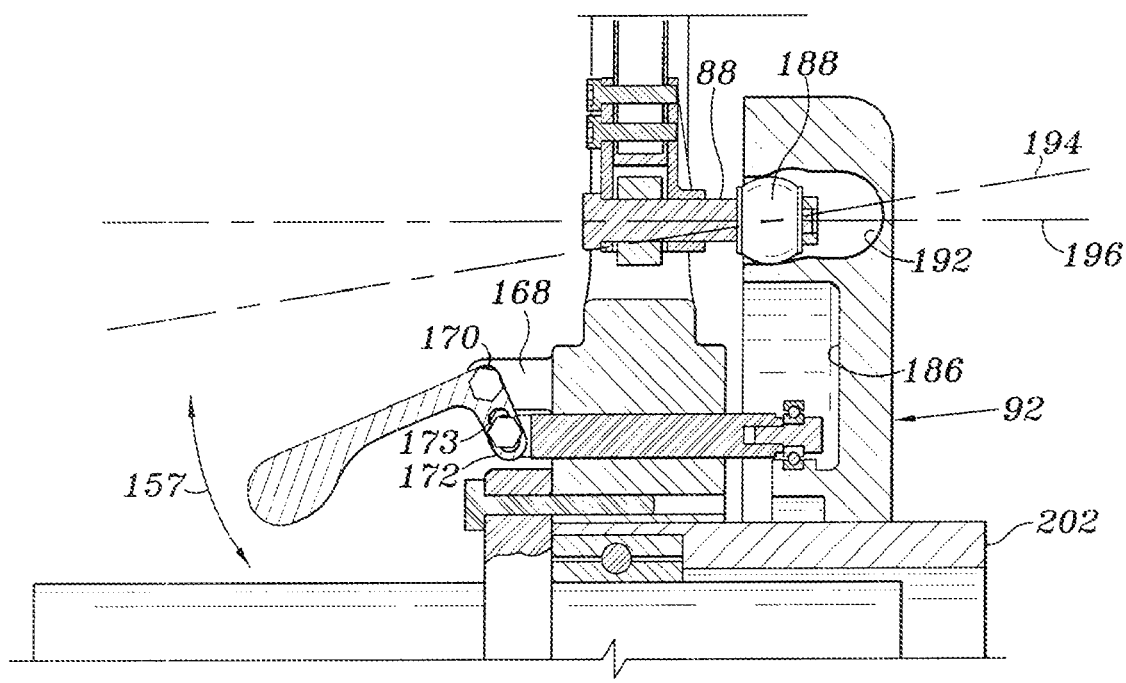
FIG. 18 is a partial sectional view of the governor mechanism and a modified cam with a variation of the cam groove that is shown in FIGS. 15 through 17.
Figure 19:
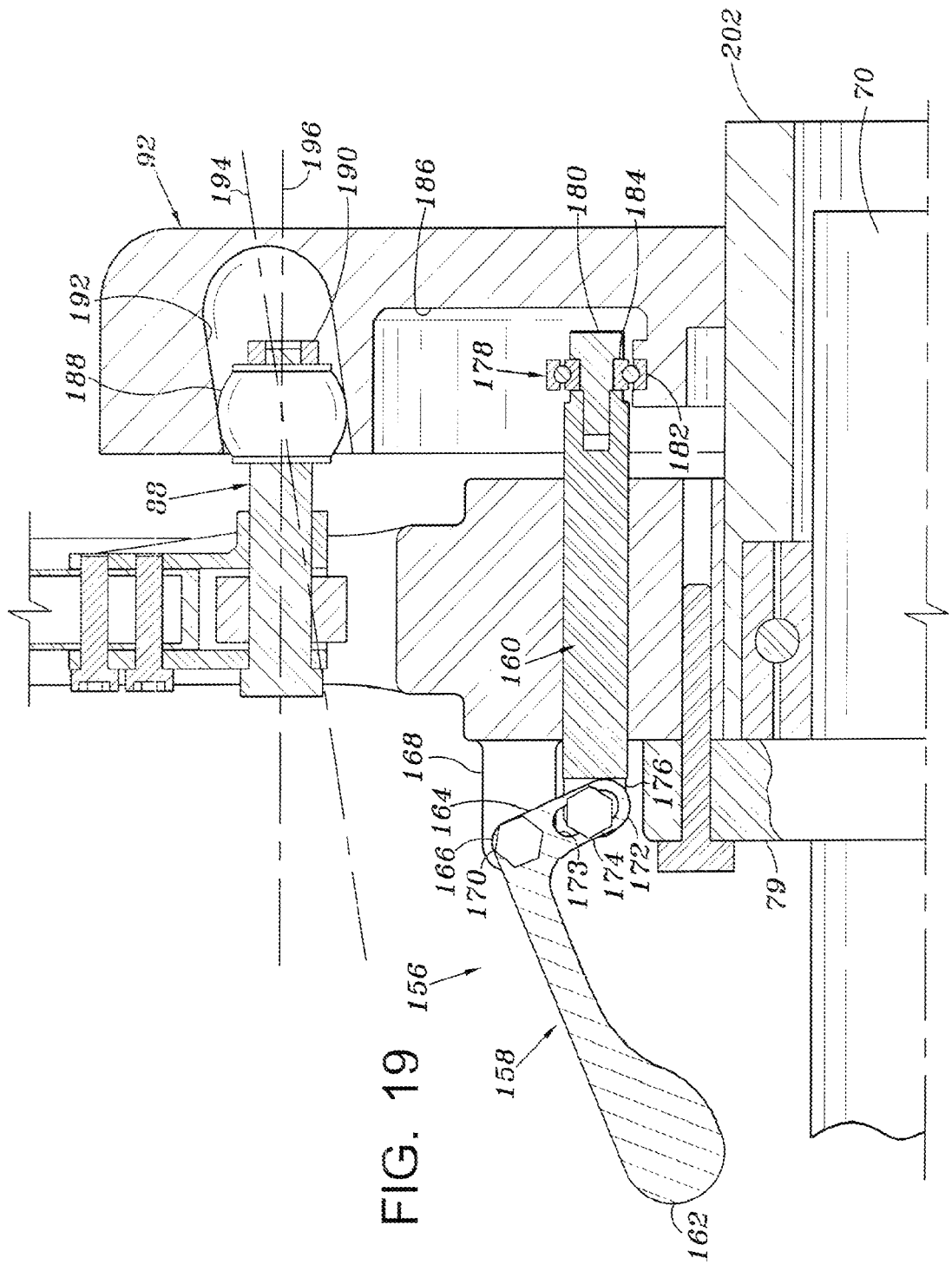
FIG. 19 is a detailed partial sectional view of the turbine power generator shown in FIG. 16.
Figure 20:
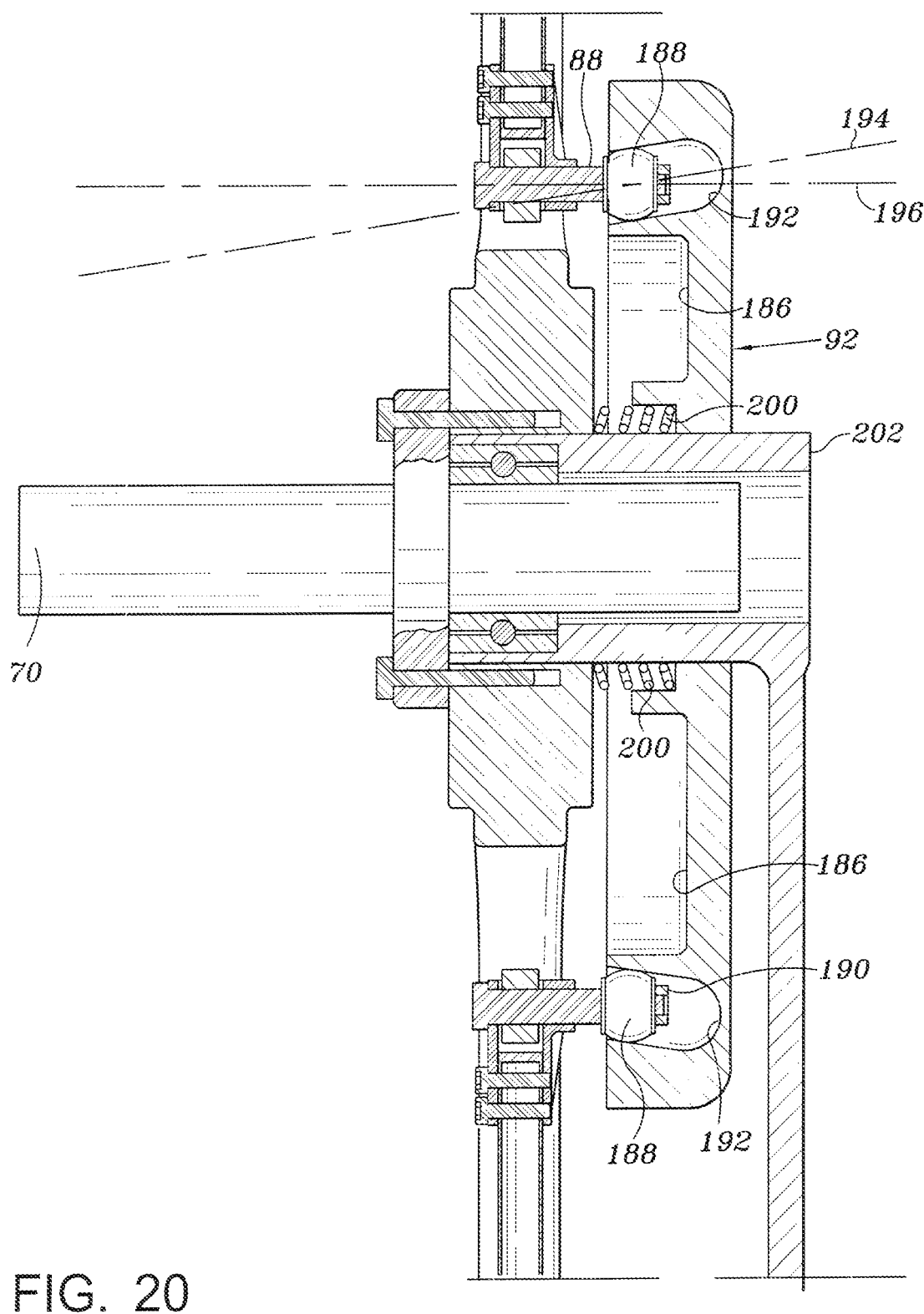
FIG. 20 is a sectional view of the modified cam of FIGS. 15 through 17 and 19 without the governor mechanism.

In the embodiment illustrated in FIGS. 15 through 20, modified cam grooves are shown. Referring to FIGS. 15 through 17 and 20, the longitudinal axis 194 of cam groove 90 is at an angle relative to the transverse axis 196 of cam 92. With reference to FIGS. 16 through 20, the angle is more than zero degrees but less than 90 degrees in the first quadrant in a rectangular coordinate system where the Y-axis is the side of cam 92 having cam groove 88 and the X-axis is axis 196. Alternatively, The relative movement to the governor mechanism brings the cam 92 closer to the arm member, causing the cam follower to move upwardly and inwardly as it travels in the cam groove. The upward movement of the cam follower 188 effects movement of the rotor blades via the control means and arm assembly to vary the pitch angle and camber of the rotor blades. Another embodiment of the cam groove is illustrated in FIGS. 18 and 19 forming a composite or modified angled cam groove having a varying surface. The varying cam groove comprises at least one angled portion that has a longitudinal axis parallel to axis 194 and a second transverse portion having a longitudinal axis substantially parallel to the transverse axis of the cam.

In another embodiment that is illustrated, shown in FIG. 21, the cam groove is angled as shown in FIGS. 15, 16 and 17, although it may include the modified cam groove of FIGS. 18 and 19, but need not include the governor mechanism described above. Referring to FIG. 21, an opposing force against the arm assembly is provided by mechanical tensioning device 200, such as a spring (shown) or deformable bearings, between the cam and the hub of the arm member. As the rotation of the arm member increases, the centrifugal forces of the rotation causes the arm assembly to move outwardly with respect to the shaft 70, forcing the cam 92 to move closer to the arm member with the effect of the cam follower moving upwardly and inwardly within the cam groove substantially as described above causing the arm assembly via link 84, as before, to vary the pitch angle and camber of the rotor blades in order to reduce rotation of rotor 20. Tensioning device 200 provides an opposing force against the cam as the cam moves closer to the arm assembly. Tensioning device 200 is located in FIG. 21 between the support and the cam. One of ordinary skill in the art will appreciate that the turbine's wind environment may be considered when determining the desired tension.

The construction and operation of the power generator embodiments described hereinbefore is believed to be understandable to those of ordinary skill in the art. Conventional engineering materials and fabrication practices may be used to construct and assemble the components of the generators. Although preferred embodiments have been described in detail herein, those skilled in the art will also recognize that various substitutions and modifications may be made without departing from the scope and spirit of the appended claims.

What is claimed is:

1. A wind driven power generator comprising:
   a frame;
   a rotor supported for rotation on said frame, said rotor including plural, circumferentially spaced apart elongated, generally parallel rotor blades, said rotor blades being supported by spaced apart arm assemblies, at least one of said arm assemblies including a hub portion drivingly connected to a drive shaft;
   wherein said rotor includes rotor blade lifting force control means having cam followers engageable with a cam operably connected to said rotor blades, wherein each of said rotor blades is connected to a control link connected to one of said cam followers, respectively, and responsive to rotation of said rotor to vary one of the pitch angle and camber of said each rotor blade with respect to the direction of wind impinging on said rotor; and
   at least one governor mechanism operably linked to said cam, wherein said mechanism modulates said rotation by varying one of said pitch angle or camber of said rotor blades.

2. The wind drive power generator set forth in claim 1, wherein:
   said cam followers engage said cam via a groove disposed in said cam.

3. The wind drive power generator set forth in claim 2, wherein:
   said cam groove has a longitudinal axis that is oriented at an angle relative to the transverse axis of said cam forming an angled cam groove.

4. The wind drive power generator set forth in claim 3, wherein:
   said governor mechanism alters the position of said angled cam groove engaging said cam followers to vary one of the pitch angle or camber of each rotor blade.

5. The wind drive power generator set forth in claim 2, wherein:
   said cam groove has a varying surface forming a varying cam groove.

6. The wind drive power generator set forth in claim 5, wherein:
   said governor mechanism alters the position of said varying cam groove engaging said cam followers to vary one of the pitch angle or camber of each rotor blade.

7. The wind drive power generator set forth in claim 6, wherein:
   said varying cam groove includes at least one angled portion and one transverse portion.

8. The wind drive power generator set forth in claim 7, wherein:
   said governor mechanism alters the position of said cam via a linkage.

9. The wind drive power generator set forth in claims 7, wherein:
   said governor mechanism shift said cam forcing said cam followers to move inwardly and upwardly into said angled groove causing said control means to vary said rotor blades angle of attack to modulate said rotor rotation.

10. A wind driven power generator comprising:
    a frame;
    a rotor supported for rotation on said frame, said rotor including plural, circumferentially spaced apart elongated, generally parallel rotor blades, said rotor blades being supported by spaced apart arm assemblies, at least one of said arm assemblies including a hub portion drivingly connected to a drive shaft;
    a rotor blade lifting force control means having cam followers engaging angled cam groove of a cam operably connected to said rotor blades, each of said rotor blades is connected to a link connected to one of said cam followers, respectively, and said control means is responsive to rotation of said rotor to vary one of the pitch angle and camber of said each rotor blade with respect to the direction of wind impinging on said rotor; and
    at least one tensioning device positioned between said cam and said hub portion.

11. The wind drive power generator set forth in claim 10, wherein:
    said cam followers engage said cam via a groove disposed in said cam, wherein said cam groove has a longitudinal axis that is oriented at an angle relative to the transverse axis of said cam forming an angled cam groove.

12. The wind drive power generator set forth in claim 11, wherein:
    said cam groove has a varying surface forming a varying cam groove.

13. The wind drive power generator set forth in claim 12, wherein:
    said varying cam groove includes at least one angled portion and one transverse portion.

* * * * *